US008755210B2

(12) United States Patent  (10) Patent No.: US 8,755,210 B2
Kangas  (45) Date of Patent: Jun. 17, 2014

(54) METHOD FOR CONTROLLING FREQUENCY CONVERTER UNIT, AND FREQUENCY CONVERTER ASSEMBLY

(75) Inventor: Jani Kangas, Espoo (FI)

(73) Assignee: ABB Oy, Helsinki (FI)

( * ) Notice: Subject to any disclaimer, the term of this patent is extended or adjusted under 35 U.S.C. 154(b) by 1229 days.

(21) Appl. No.: 12/155,456

(22) Filed: Jun. 4, 2008

(65) Prior Publication Data

US 2008/0310206 A1 Dec. 18, 2008

(30) Foreign Application Priority Data

Jun. 6, 2007 (FI) ................................. 20075418

(51) Int. Cl.
*H02M 5/00* (2006.01)

(52) U.S. Cl.
USPC ........................................................ 363/157

(58) Field of Classification Search
USPC ................... 363/170, 157, 159, 164, 163; 336/115–118; 340/310, 310.11, 340/310.17, 127
See application file for complete search history.

(56) References Cited

U.S. PATENT DOCUMENTS

| 4,319,224 | A | | 3/1982 | Tappeiner et al. |
| 5,614,811 | A | * | 3/1997 | Sagalovich et al. ........... 323/207 |
| 6,043,640 | A | | 3/2000 | Lauby et al. |
| 6,731,102 | B2 | * | 5/2004 | Gregorec et al. ........... 324/99 D |
| 6,768,700 | B2 | * | 7/2004 | Veneruso et al. ............... 367/81 |
| 7,102,478 | B2 | * | 9/2006 | Pridmore et al. ............. 336/176 |
| 7,288,929 | B2 | * | 10/2007 | Prsha et al. ..................... 324/127 |
| 7,439,726 | B2 | * | 10/2008 | Luo et al. ....................... 324/127 |
| 7,453,353 | B1 | * | 11/2008 | Henry ....................... 340/538.12 |
| 7,557,559 | B1 | * | 7/2009 | Olsson et al. .................... 324/67 |
| 2005/0110650 | A1 | | 5/2005 | Haines |
| 2007/0017301 | A1 | | 1/2007 | Prsha et al. |
| 2009/0052281 | A1 | * | 2/2009 | Nybo et al. ....................... 367/81 |

FOREIGN PATENT DOCUMENTS

| CN | 1215839 A | | 5/1999 | |
| CN | 1493111 A | | 4/2004 | |
| DK | EP 1748573 | * | 1/2007 | ...................... 367/81 |
| JP | 09-014150 | * | 6/1995 | .............. F04B 49/06 |
| JP | 09-014149 A | | 1/1997 | |
| JP | 9-14150 A | | 1/1997 | |
| WO | 02054605 A1 | | 7/2002 | |
| WO | WO 2007/014638 | * | 2/2007 | ...................... 367/81 |

OTHER PUBLICATIONS

Machine Translation JP-09014150.*
Finland Search Report.

(Continued)

*Primary Examiner* — Adolf Berhane
(74) *Attorney, Agent, or Firm* — Buchanan Ingersoll & Rooney PC

(57) ABSTRACT

A method for controlling a frequency converter unit, the frequency converter unit containing an input connection for supplying electric power at an input frequency to the frequency converter unit, and an output connection for supplying electric power at an output frequency from the frequency converter unit, the method comprising a control step, in which the frequency converter unit is controlled by means of control signals. In the control step the control signals are supplied through an inductive connection to at least one wire connected to the input connection or the output connection of the frequency converter unit for transmitting electric power, the control signals being supplied to the frequency converter unit over the at least one wire.

7 Claims, 2 Drawing Sheets

(56) References Cited

OTHER PUBLICATIONS

Second Office dated Mar. 7, 2012 in corresponding Chinese Patent Application No. 200810108991.X, 11 pages.

An English Translation of the First Office Action dated Sep. 26, 2011, issued in the corresponding Chinese Patent Application No. 200810108991.X.

* cited by examiner

METHOD FOR CONTROLLING FREQUENCY CONVERTER UNIT, AND FREQUENCY CONVERTER ASSEMBLY

BACKGROUND OF THE INVENTION

The invention relates to the control of frequency converters.

In a conventional frequency converter assembly the user interface means of the frequency converter unit is arranged in association with the frequency converter unit. A problem with this kind of arrangement is that if the frequency converter unit is inconveniently placed, for example high up, it is difficult for the user to control the frequency converter unit.

BRIEF DISCLOSURE OF THE INVENTION

It is an object of the invention to provide a method for controlling a frequency converter unit and a frequency converter assembly that allow the above problem to be solved. The object of the invention is achieved by a method and a frequency converter assembly characterized by what is stated in the independent claims. The preferred embodiments of the invention are disclosed in the dependent claims.

The invention is based on the idea of controlling the frequency converter unit by supplying the control signals through an inductive connection to a wire connected to the input connection or the output connection of the frequency converter unit, the control signals being supplied to the frequency converter unit over the wire in question.

The control signals may travel in an electric wire between the feeder network and the frequency converter unit, for example, or in an electric wire between the frequency converter unit and its load. According to an embodiment of the invention a single user interface means is used for controlling a plural number of frequency converter units connected to one and the same electric power network, the control signals travelling through the network.

An advantage of the invention is that if necessary the user interface means of the frequency converter unit may be placed at a distance from the frequency converter unit. The user interface means may be movable.

BRIEF DISCLOSURE OF THE FIGURES

In the following the invention will be described in greater detail with reference to preferred embodiments and the accompanying drawings, in which FIG. 1 illustrates a frequency converter assembly with a user interface means coupled to an electric wire between the feeder network and the frequency converter unit;

DETAILED DISCLOSURE OF THE INVENTION

Figure 1:
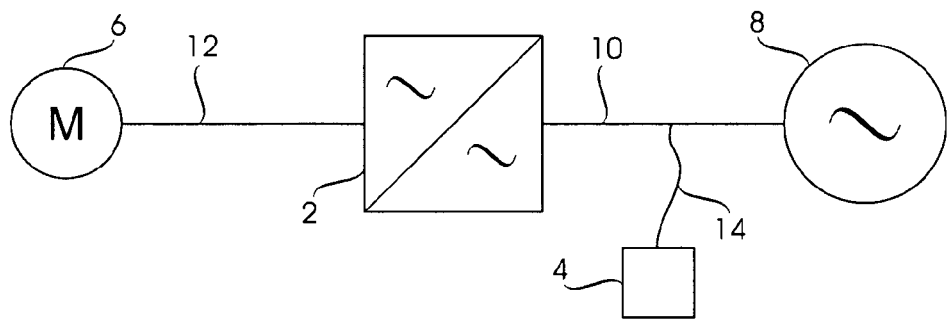

FIG. 1 illustrates a frequency converter assembly according to an embodiment of the invention, comprising a frequency converter unit 2, a user interface means 4 and an electric motor 6 fed by the frequency converter unit. A feeder network 8 supplies electric power at an input frequency to an input connection of the frequency converter unit 2 over a feeder cable 10. The frequency converter unit 2 supplies electric power at an output frequency from its output connection to the electric motor over a motor cable 12. The user interface means 4 controls the frequency converter unit 2 by transmitting control signals thereto over the feeder cable 10. The control signals travel from the user interface means 4 to the feeder cable 10 via a signal interface means 14.

Figure 2:
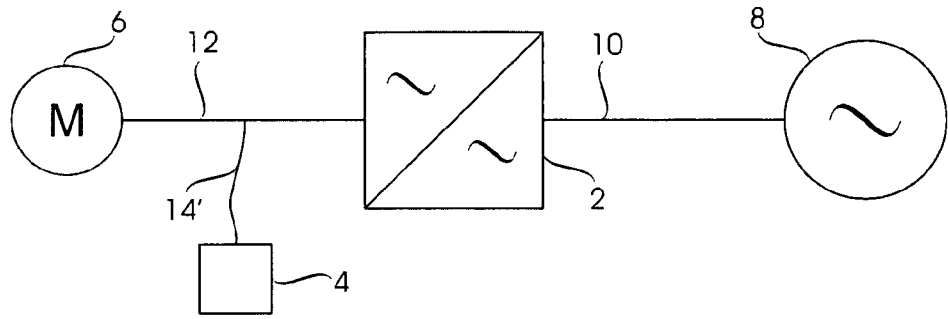
FIG. 2 illustrates a frequency converter assembly with a user interface means coupled to an electric wire between the frequency converter unit and its load.

FIG. 2 illustrates a frequency converter assembly, which is a variation of the assembly shown in FIG. 1. Instead of being connected to the feeder cable 10, the user interface 4 of the assembly of FIG. 2 is connected to the motor cable 12, i.e. the user interface means 4 transmits the control signals to the frequency converter unit 2 over the motor cable 12. The signal interface means carrying the control signals from the user interface means 4 to the motor cable 12 is denoted with reference numeral 14'. Otherwise the frequency converter assemblies of FIGS. 1 and 2 are identical.

The signal interface means 14 and 14' are configured to be inductively connected to the cable of the frequency converter unit 2. This inductive connection may be implemented for example by providing the signal interface means with an openable induction loop, which in its open position may be placed around the cable, whereas in its closed position it is arranged to supply control signals to an electric wire inside the induction loop. The operating principle of an openable induction loop is generally known from clip-on meters.

Figure 4A:
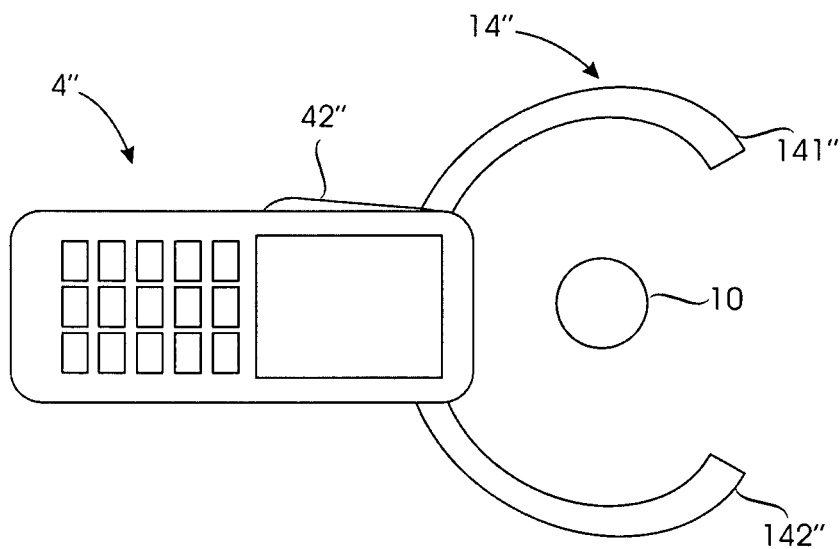
FIG. 4A illustrates a user interface means provided with an openable induction loop, the induction loop being in its open position.
Figure 4B:
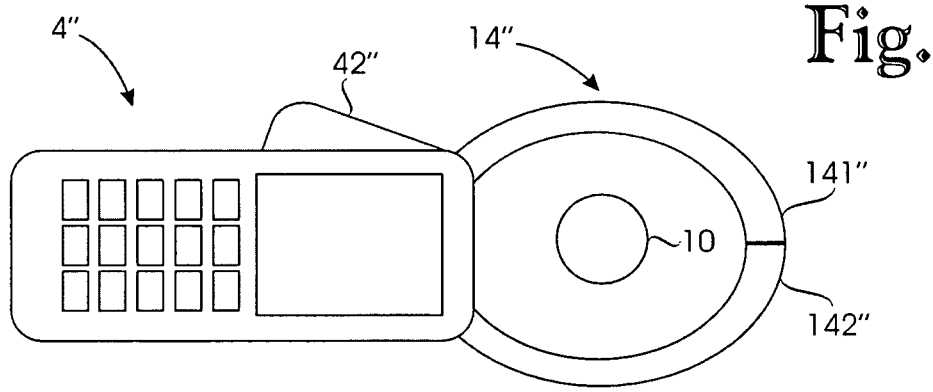
FIG. 4B illustrates the user interface means of FIG. 4A with the openable induction loop in its closed position.

FIGS. 4A and 4B illustrate a user interface means 4" according to an embodiment of the invention, provided with a signal interface means 14" comprising an openable induction loop. The user interface means 4" comprises an actuation member 42", and by pressing the actuation member the user is able to open the jaws 141" and 142" of the induction loop. In FIG. 4A the jaws 141" and 142" of the openable induction loop are in the open position, in which the distance between the tips of the jaws 141" and 142" is substantially greater than the diameter of the feeder cable 10. In FIG. 4B the jaws 141" and 142" of the openable induction loop are in the closed position and the feeder cable 10 is inside the induction loop formed by the jaws 141" and 142", thus allowing control signals to be supplied inductively into the feeder cable 10.

Figure 3:
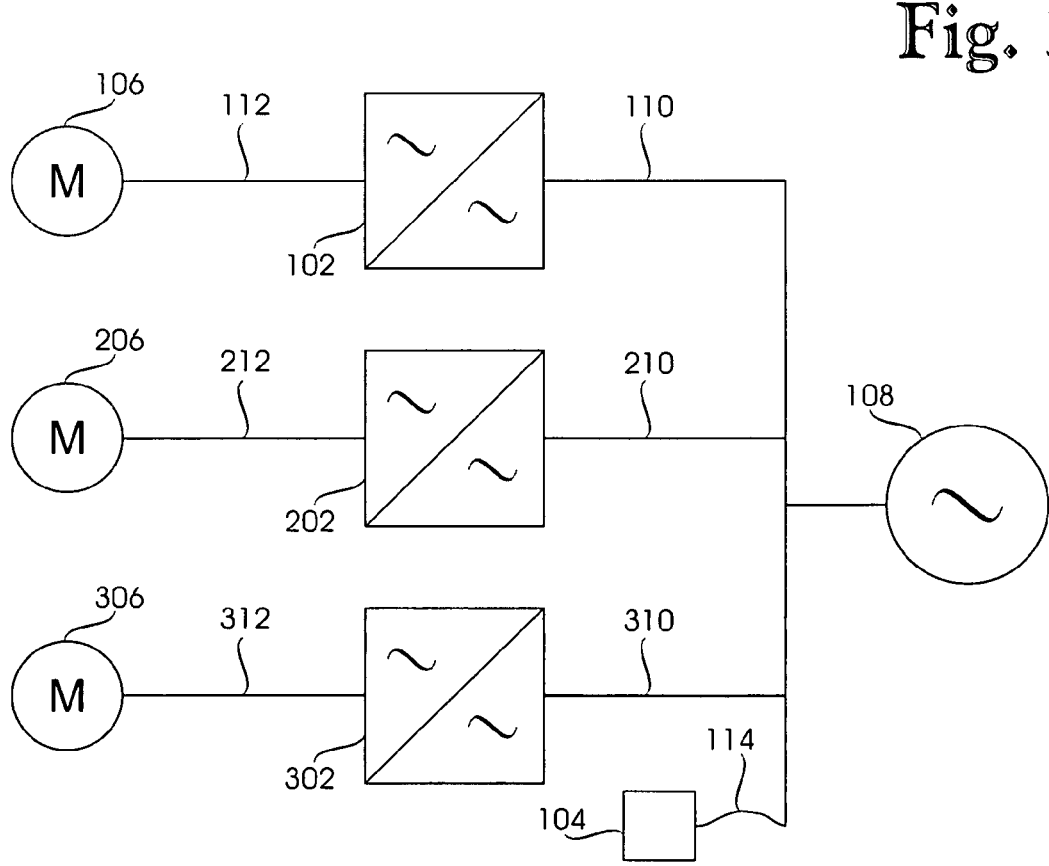
FIG. 3 illustrates a frequency converter assembly, in which a single user interface means is used for controlling a plural number of frequency converter units connected to one and the same electric power network.

FIG. 3 illustrates a frequency converter assembly, in which a single user interface means 104 is used for controlling three frequency converter units 102, 202 and 302 connected to one and the same feeder network 108. The frequency converter unit 102 is supplied with electric power from the feeder network 108 over a feeder cable 110, the frequency converter unit 102 feeding an electric motor 106 over a motor cable 112. The frequency converter unit 202 is supplied with electric power from the feeder network 108 over a feeder cable 210, the frequency converter unit 202 feeding an electric motor 206 over a motor cable 212. The feeder cable of the frequency converter unit 302 is denoted by reference numeral 310, its motor cable by reference numeral 312, and the electric motor to be fed by reference numeral 306. The user interface means 104 is inductively connected to the feeder network 108 through a signal interface means 114.

The user interface means 4, 104 of FIGS. 1 to 3 may be configured to carry out bidirectional data transfer in which they are not only capable of transmitting control signals to the frequency converter unit but also receiving response signals from the frequency converter unit. The response signals may contain data on the actual values of the current and voltage supplied by the frequency converter, for example, and on any failure signals of the frequency converter unit.

The user interface means of the invention may be arranged to transmit control signals to the frequency converter unit by using a known modulation, such as PSK, ASK, FSK or PAM, together with a known protocol. In the embodiments of FIGS. 1 and 3 the modulated control signal is supplied over a voltage wave of a basic frequency in the feeder network. In the embodiment of FIG. 2 the modulated control signal is supplied over a voltage wave of an output frequency generated by the frequency converter unit.

The user interface means of the frequency converter assembly may be configured so as to allow the control signals it transmits to travel through transformers and other similar devices producing a galvanic isolation.

A person skilled in the art will find it apparent that the basic idea of the invention may be implemented in various ways. The invention and its embodiments are therefore not restricted to the above examples but may vary within the scope of the claims.

The invention claimed is:

1. A method for controlling a frequency converter unit, the frequency converter unit containing an input connection for receiving electric power at an input frequency, and an output connection for supplying electric power at an output frequency, the method comprising:
    supplying control signals to at least one wire connected to the input connection or the output connection of the frequency converter unit through an inductive connection, wherein the control signals alter at least one operational parameter of the frequency converter unit, the inductive connection including an openable induction loop having an open position and a closed position, the open position being arranged for setting the openable induction loop around the at least one wire and the closed position being arranged for supplying control signals to the at least one wire inside the openable induction loop.

2. The method according to claim 1, wherein the frequency converter unit receives the control signals at the input connection or the output connection.

3. A frequency converter unit comprising:
    a frequency converter having an input connection for receiving electric power at an input frequency, and an output connection for supplying electric power at an output frequency; and
    a user interface means for transmitting control signals to the frequency converter unit through the input connection or the output connection of the frequency converter unit,
    wherein the user interface means is arranged to be inductively connected to at least one wire for transmitting control signals to the frequency converter unit, the inductive connection comprising an openable induction loop having an open position and a closed position, the open position being arranged for setting the openable induction loop around the at least one wire and the closed position being arranged for supplying control signals to the at least one wire inside the openable induction loop, and
    wherein the at least one wire is connected to the input connection or the output connection of the frequency converter unit.

4. A frequency converter assembly comprising:
    a frequency converter unit having an input connection side that receives electric power from a power source over a first cable at an input frequency, and an output connection side that supplies electric power to a load over a second cable at an output frequency; and
    a user interface configured to transmit control signals to the frequency converter unit through the output connection of the frequency converter unit, and is inductively connected to the second cable on the output connection side the frequency converter, the inductive connection comprising an openable induction loop having an open position and a closed position, the open position being arranged for setting the openable induction loop around the at least one wire and the closed position being arranged for supplying control signals to the second cable.

5. The frequency converter assembly of claim 4, wherein the user interface is configured to receive response signals from the frequency converter over the second cable.

6. The frequency converter assembly of claim 4, wherein the user interface includes a signal interface that includes the openable induction loop having adjustable jaws.

7. The frequency converter assembly of claim 4, wherein the user interface includes an actuator that adjusts the jaws of the openable induction loop between open and closed positions.

* * * * *